US010328750B2

(12) United States Patent
Rehab et al.

(10) Patent No.: US 10,328,750 B2
(45) Date of Patent: Jun. 25, 2019

(54) TIRE COMPRISING A LAYER OF CIRCUMFERENTIAL REINFORCING ELEMENTS

(71) Applicants: COMPAGNIE GENERALE DES ETABLISSEMENTS MICHELIN, Clermont-Ferrand (FR); MICHELIN RECHERCHE ET TECHNIQUE S.A., Granges-Paccot (CH)

(72) Inventors: Hichem Rehab, Clermont-Ferrand (FR); Jean-François Parmentier, Clermont-Ferrand (FR)

(73) Assignee: COMPAGNIE GENERALE DES ETABLISSEMENTS MICHELIN, Clermont-Ferrand (FR)

(*) Notice: Subject to any disclaimer, the term of this patent is extended or adjusted under 35 U.S.C. 154(b) by 101 days.

(21) Appl. No.: 15/321,080

(22) PCT Filed: May 27, 2015

(86) PCT No.: PCT/EP2015/061694
§ 371 (c)(1),
(2) Date: Dec. 21, 2016

(87) PCT Pub. No.: WO2015/197285
PCT Pub. Date: Dec. 30, 2015

(65) Prior Publication Data
US 2017/0197469 A1    Jul. 13, 2017

(30) Foreign Application Priority Data

Jun. 26, 2014 (FR) ...................................... 14 55955

(51) Int. Cl.
*B60C 9/18* (2006.01)
*B60C 9/20* (2006.01)
(Continued)

(52) U.S. Cl.
CPC ............ *B60C 9/185* (2013.01); *B60C 9/1835* (2013.01); *B60C 9/2006* (2013.01); *C08K 13/02* (2013.01);
(Continued)

(58) Field of Classification Search
CPC ......... B60C 9/18; B60C 9/1835; B60C 9/185; B60C 2009/1842; B60C 2009/1871; B60C 2009/1878
See application file for complete search history.

(56) References Cited

U.S. PATENT DOCUMENTS 9,636,950 B2 * 5/2017 Domingo .............. B60C 9/2006
2010/0084069 A1 * 4/2010 Maruoka ............... B60C 9/2006
152/527

(Continued)

FOREIGN PATENT DOCUMENTS

CN  201895537  *  7/2011
EP  0785096  7/1997

(Continued)

*Primary Examiner* — Justin R Fischer
(74) *Attorney, Agent, or Firm* — Cozen O'Connor (57) ABSTRACT

Tire comprising a crown reinforcement formed of at least two working crown layers of reinforcing elements, a first layer C of rubber compound being placed between at least the ends of the said at least two working crown layers, a second layer S of polymer compound being in contact with at least one working crown layer and in contact with the carcass reinforcement and the crown reinforcement comprising at least one layer of circumferential reinforcing elements. The elastic modulus under tension at 10% elongation of the first layer C is less than 8 MPa, the maximum tan(δ) value, denoted tan(δ)$_{max}$, of the first layer C is less than 0.100, and the complex dynamic shear modulus G*, measured at 10% and 60° C. on the return cycle, of the said second layer S of polymer compound is greater than 1.35 MPa.

18 Claims, 3 Drawing Sheets

(51) Int. Cl.
*C08K 13/02* (2006.01)
*C08L 7/00* (2006.01)
*B60C 1/00* (2006.01)

(52) U.S. Cl.
CPC ........ *C08L 7/00* (2013.01); *B60C 2001/0066* (2013.01); *B60C 2001/0075* (2013.01); *B60C 2009/1878* (2013.01); *B60C 2009/2061* (2013.01); *B60C 2009/2064* (2013.01)

(56) References Cited

U.S. PATENT DOCUMENTS

| | | | |
|---|---|---|---|
| 2010/0154945 A1* | 6/2010 | Gandon-Pain | C08F 287/00 152/151 |
| 2012/0247630 A1* | 10/2012 | Moreland | B60C 1/0016 152/209.1 |
| 2014/0251521 A1* | 9/2014 | Domingo | B60C 9/2006 152/527 |

FOREIGN PATENT DOCUMENTS

| | | | |
|---|---|---|---|
| FR | 1389428 | | 7/1963 |
| FR | 2222232 | | 3/1974 |
| GB | 1177159 | * | 1/1970 |
| JP | 2006-124487 | * | 5/2006 |
| WO | WO99/24269 | | 5/1999 |
| WO | WO2004/076204 | | 9/2004 |
| WO | WO 2006/013077 | | 2/2006 |
| WO | WO 2009/083212 | | 7/2009 |
| WO | WO2012/069603 | | 5/2012 |
| WO | WO 2013/053877 | * | 4/2013 |
| WO | WO 2013/53879 | * | 4/2013 |

* cited by examiner

TIRE COMPRISING A LAYER OF CIRCUMFERENTIAL REINFORCING ELEMENTS

RELATED APPLICATIONS

This is a U.S. National Phase Application under 35 USC 371 of International Application PCT/EP2015/061694 filed on May 27, 2015.

This application claims the priority of French application no. FR1455955 filed Jun. 26, 2014, the entire content of which is hereby incorporated by reference.

FIELD OF THE INVENTION

The present invention relates to a tire having a radial carcass reinforcement, and more particularly a tire intended to equip vehicles that carry heavy loads and run at sustained speed, such as lorries, tractors, trailers or buses, for example.

BACKGROUND OF THE INVENTION

In the tires of heavy duty type, the carcass reinforcement is generally anchored on either side in the area of the bead and is surmounted radially by a crown reinforcement made up of at least two layers that are superimposed and formed of threads or cords which are parallel in each layer and crossed from one layer to the next, forming angles of between 10° and 45° with the circumferential direction. The said working layers that form the working reinforcement may furthermore be covered with at least one layer, referred to as a protective layer, formed of reinforcing elements which are advantageously metallic and extensible and referred to as elastic reinforcing elements. It may also comprise a layer of metal threads or cords having low extensibility, forming an angle of between 45° and 90° with the circumferential direction, this ply, referred to as the triangulation ply, being located radially between the carcass reinforcement and the first crown ply, referred to as the working ply, formed of parallel threads or cords lying at angles not exceeding 45° in terms of absolute value. The triangulation ply forms a triangulated reinforcement with at least the said working ply, this reinforcement having low deformation under the various stresses which it undergoes, the triangulation ply essentially serving to absorb the transverse compressive forces that act on all the reinforcing elements in the crown area of the tire.

Cords are said to be inextensible when the said cords exhibit, under a tensile force equal to 10% of the breaking force, a relative elongation at most equal to 0.2%.

Cords are said to be elastic when the said cords exhibit, under a tensile force equal to the breaking load, a relative elongation at least equal to 3% with a maximum tangent modulus of less than 150 GPa.

Circumferential reinforcing elements are reinforcing elements which form angles with the circumferential direction in the range +2.5°, −2.5° around 0°.

The circumferential direction of the tire, or longitudinal direction, is the direction that corresponds to the periphery of the tire and is defined by the direction in which the tire runs.

The transverse or axial direction of the tire is parallel to the axis of rotation of the tire.

The radial direction is a direction that intersects the axis of rotation of the tire and is perpendicular thereto.

The axis of rotation of the tire is the axis about which it turns in normal use.

A radial or meridian plane is a plane which contains the axis of rotation of the tire.

The circumferential median plane, or equatorial plane, is a plane perpendicular to the axis of rotation of the tire and which divides the tire into two halves.

The "elastic modulus" of a rubber compound is to be understood as meaning a secant extension modulus at 10% deformation and at ambient temperature.

As far as rubber compositions are concerned, modulus measurements are taken under tension in accordance with standard AFNOR-NFT-46002 of September 1988: the nominal secant modulus (or apparent stress, in MPa) at 10% elongation (normal temperature and relative humidity conditions in accordance with standard AFNOR-NFT-40101 of December 1979) is measured in second elongation (i.e. after an accommodation cycle).

Some current tires, referred to as "road" tires, are intended to run at high speed and over increasingly long journeys, as a result of the improvement in the road network and of the growth of the motorway network throughout the world. The combined conditions under which such a tire is called upon to run without any doubt makes possible an increase in the distance travelled, the wear on the tire being reduced, but on the other hand, the endurance of the tire and in particular of the crown reinforcement is detrimentally affected.

This is because there are stresses in the crown reinforcement and, more particularly, shear stresses between the crown layers, combined with a not-insignificant rise in the operating temperature at the ends of the axially shortest crown layer which have the effect of causing cracks in the rubber to appear and spread at the said ends.

In order to improve the endurance of the crown reinforcement of the type of tire under consideration, solutions relating to the structure and quality of the layers and/or the profiled elements of rubber compounds which are placed between and/or around the ends of the plies and, more particularly, the ends of the axially shortest ply have already been applied.

It is notably known practice to introduce a layer of rubber compound between the ends of the working layers in order to create an uncoupling between the said ends in order to limit shear stresses. Such decoupling layers must, however, exhibit a very good cohesion. Such layers of rubber compounds are, for example, described in Patent Application WO 2004/076204.

Patent FR 1 389 428, in order to improve the resistance to degradation of the rubber compounds situated near the crown reinforcement edges, recommends the use, in combination with a low-hysteresis tread, of a rubber profiled element covering at least the sides and the marginal edges of the crown reinforcement and made up of a low-hysteresis rubber compound.

Patent FR 2 222 232, in order to avoid separations between crown reinforcement plies, teaches the coating of the reinforcement ends in a cushion of rubber of Shore A hardness different from that of the tread surmounting the said reinforcement, and higher than the Shore A hardness of the profiled element of rubber compound placed between the edges of crown reinforcement and carcass reinforcement plies.

Tires produced in this way do effectively allow an improvement in performance notably in terms of endurance.

Moreover, it is known practice, in order to produce tires with a very wide tread or in order to confer greater load bearing capacity on tires of a given dimension, to introduce a layer of circumferential reinforcing elements. Patent application WO 99/24269 describes, for example, the presence of such a layer of circumferential reinforcing elements.

The layer of circumferential reinforcing elements is usually made up of at least one metal cord wound to form a turn of which the angle of layering with respect to the circumferential direction is less than 2.5°.

SUMMARY OF THE INVENTION

It is an object of the invention to provide tires of which the properties, notably in terms of endurance and wear, and the dynamic properties, notably the cornering stiffness, are maintained whatever the degree of wear and the performances of which in terms of rolling resistance are improved in order to contribute towards a lower fuel consumption for vehicles fitted with such tires.

This object is achieved according to one aspect of the invention directed to a tire with a radial carcass reinforcement comprising a crown reinforcement formed of at least two working crown layers of reinforcing elements, crossed from one layer to the other making with the circumferential direction angles comprised between 10° and 45°, a first layer C of rubber compound being placed between at least the ends of the said at least two working crown layers, a second layer S of polymer compound being in contact with at least one working crown layer and in contact with the carcass reinforcement, the said second layer of polymer compound extending axially as far as at least the axial end of the tread, the said tread radially capping the crown reinforcement and being connected to two beads by two side walls, the crown reinforcement comprising at least one layer of circumferential metal reinforcing elements, the elastic modulus under tension at 10% elongation of the first layer C being less than 8 MPa, the maximum $\tan(\delta)$ value, denoted $\tan(\delta)_{max}$, of the first layer C being less than 0.100 and the complex dynamic shear modulus G*, measured at 10% and 60° C. on the return cycle, of the said second layer S of polymer compound being greater than 1.35 MPa.

The loss factor $\tan(\delta)$ is a dynamic property of the layer of rubber compound. It is measured on a viscosity analyzer (Metravib VA4000) according to Standard ASTM D 5992-96. The response of a sample of vulcanized composition (cylindrical test specimen 4 mm thick and 400 mm² in cross section), subjected to sinusoidal loading in simple alternating shear stress at a frequency of 10 Hz, at a temperature of 60° C. is recorded. The sweep is carried out in deformation amplitude from 0.1 to 50% (outward cycle), then from 50% to 1% (return cycle). The results exploited are the complex dynamic shear modulus (G*) and the loss factor $\tan(\delta)$ measured on the return cycle. For the return cycle, the maximum observed value for $\tan(\delta)$ is indicated, denoted $\tan(\delta)_{max}$.

The rolling resistance is the resistance that occurs when the tire is rolling. It is represented by the hysteresis losses related to the deformation of the tire during a revolution. The frequency values associated with the revolving of the tire correspond to $\tan(\delta)$ values measured between 30 and 100° C. The value for $\tan(\delta)$ at 100° C. thus corresponds to an indication of the rolling resistance of the tire when running.

It is also possible to estimate the rolling resistance by measuring rebound energy losses for test specimens with energy imposed at temperatures of 60° C. and expressed as percentages.

Advantageously according to an embodiment of the invention, the loss at 60° C., denoted P60, for the layer of rubber compound C is less than 20%.

The first layer C of rubber compound makes it possible to obtain decoupling of the said working crown layers so as to spread the shear stresses over a greater thickness.

Within the meaning of the invention, layers that are coupled are layers in which the respective reinforcing elements are separated radially by at most 1.5 mm, the said thickness of rubber being measured radially between the respectively upper and lower generatices of the said reinforcement elements.

The use of compounds with elastic modulus values less than or equal to 8 MPa and with $\tan(\delta)_{max}$ values of less than 0.100 makes it possible to improve the properties of the tire in terms of rolling resistance while at the same time maintaining satisfactory endurance properties.

According to a preferred embodiment of the invention, the first layer C of rubber compound is an elastomeric compound based on natural rubber or on synthetic polyisoprene with a predominance of cis-1,4 chains and possibly at least one other diene elastomer, the natural rubber or the synthetic polyisoprene in the case of a blend being present at a content that predominates over the content of the other diene elastomer or elastomers used and of a reinforcing filler made up of:

a) either carbon black of BET specific surface area greater
        than 60 m²/g,
        i. used at a content of between 20 and 40 phr when the
           oil absorption number (COAN) of the carbon black
           is greater than 85,
        ii. used at a content of between 20 and 60 phr when the
           oil absorption number (COAN) of the carbon black
           is less than 85,
    b) or carbon black with a BET specific surface area less
        than 60 m²/g, whatever its oil absorption number, used
        at a content of between 20 and 80 phr, and preferably
        of between 30 and 50 phr,
    c) or a white filler of the silica and/or alumina type
        comprising SiOH and/or AlOH functional groups at the
        surface, selected from the group formed of precipitated
        or pyrogenated silicas, aluminas or aluminosilicates or
        alternatively still, carbon blacks modified during or
        after synthesis with BET specific surface areas of
        between 30 and 260 m²/g used at a content of between
        20 and 80 phr and preferably of between 30 and 50 phr,
    d) or a blend of carbon black described at (a) and/or of
        carbon black described at (b) and/or a white filler
        described at (c), in which the overall filler content is
        between 20 and 80 phr, and preferably between 40 and
        60 phr.

The BET specific surface area measurement is performed in accordance with the BRUNAUER, EMMET and TELLER method described in "The Journal of the American Chemical Society", Vol. 60, page 309, February 1938, corresponding to standard NFT 45007, November 1987.

The Compressed Oil Absorption Number (COAN) is measured in accordance with standard ASTM D3493.

If a clear filler or a white filler is being used, it is necessary to use a coupling and/or covering agent selected from the agents known to those skilled in the art. Mention may be made, as examples of preferred coupling agents, of alkoxysilane sulphides of the bis(3-trialkoxysilylpropyl) polysulphide type and among these in particular of bis(3-triethoxysilylpropyl) tetrasulphide, sold by Degussa under the name Si69 for the pure liquid product and the name X50S for the solid product (50/50 by weight blend with N330 black). Mention may be made, as examples of covering agents, of a fatty alcohol, an alkylalkoxysilane, such as a hexadecyltrimethoxysilane or hexadecyltriethoxysilane respectively sold by Degussa under the names Si116 and Si216, diphenylguanidine, a polyethylene glycol or a silicone oil, optionally modified by means of OH or alkoxy functional groups. The coating and/or coupling agent is used in a proportion of $\geq 1/100$ and $\leq 20/100$ by weight to the filler, and preferably in the range from 2/100 to 15/100 if the clear filler forms the whole of the reinforcing filler and in the range from 1/100 to 20/100 if the reinforcing filler is formed by a blend of carbon black and clear filler.

Other examples of reinforcing fillers that have the morphology and surface SiOH and/or AlOH functions of materials of the silica and/or alumina type described hereinabove and that can be used according to the invention as a partial or complete replacement for these include carbon blacks modified either during synthesis by addition to the oil fed to the oven of a silicon and/or aluminium compound or after synthesis by addition, to an aqueous suspension of carbon black in a solution of sodium silicate and/or aluminate of an acid so as to at least partially cover the surface of the carbon black with SiOH and/or AlOH functions. Mention may be made, as nonlimiting examples of carbon-based fillers of this type with SiOH and/or AlOH functional groups at the surface, of the fillers of CSDP type described in Conference No. 24 of the ACS Meeting, Rubber Division, Anaheim, Calif., 6-9 May 1997, and also those of Patent Application EP-A-0 799 854.

When a clear filler is used as the only reinforcing filler, the hysteresis and cohesion properties are obtained by using a precipitated or pyrogenated silica or alternatively a precipitated alumina or even an aluminosilicate with a BET specific surface area comprised between 30 and 260 m$^2$/g. Mention may be made, as nonlimiting examples of filler of this type, of the silicas KS404 from Akzo, Ultrasil VN2 or VN3 and BV3370GR from Degussa, Zeopol 8745 from Huber, Zeosil 175MP or Zeosil 1165MP from Rhodia, HI-SIL 2000 from PPG, and the like.

Included among the diene elastomers that can be used as a blend with natural rubber or a synthetic polyisoprene with a predominance of cis-1,4 chains, mention may be made of a polybutadiene (BR) preferably with a predominance of cis-1,4 chains, a styrene-butadiene copolymer (SBR) solution or emulsion, a butadiene-isoprene copolymer (BIR) or alternatively still, a styrene-butadiene-isoprene terpolymer (SBIR). These elastomers can be elastomers modified during polymerization or after polymerization by means of branching agents, such as a divinylbenzene, or star-branching agents, such as carbonates, halotins or halosilicons, or alternatively by means of functionalization agents resulting in a grafting, to the chain or at the chain end, of oxygen-comprising carbonyl or carboxyl functional groups or else of an amine functional group, such as, for example, by the action of dimethylaminobenzophenone or diethylaminobenzophenone. In the case of blends of natural rubber or synthetic polyisoprene predominantly comprising cis-1,4 chains with one or more of the diene elastomers mentioned above, the natural rubber or the synthetic polyisoprene is preferably used at a predominant content and more preferably at a content of greater than 70 phr.

According to this preferred embodiment of the invention, a lower elastic modulus is generally accompanied by a lower viscous modulus G', this change proving to be favourable to reducing the rolling resistance of the tire.

The most conventional tire designs provide layers of rubber compound placed between the ends of the working crown layers with elastic modulus values under tension at 10% elongation greater than 8.5 MPa, notably to make it possible to limit shear stresses between the ends of the working crown layers, the circumferential stiffnesses of the said working crown layers being zero at their ends. Such modulus values which are most often even higher than 9 MPa make it possible to prevent the beginnings and spread of cracks through the rubber compounds at the ends of the said working crown layers and more particularly at the end of the narrowest working layer.

The inventors have been able to demonstrate that the presence of at least one layer of circumferential reinforcing elements makes it possible to maintain performance notably in terms of endurance but also in terms of satisfactory wear with an elastic modulus under tension at 10% elongation of the layer C of less than 8 MPa.

The inventors have also been able to demonstrate that the cohesion of the layer C, when it has an elastic modulus under tension at 10% elongation less than 8 MPa, remains satisfactory.

Within the meaning of the invention, a cohesive rubber compound is a rubber compound that is notably robust in relation to cracking. The cohesion of the compound is thus evaluated by a fatigue cracking test performed on a "PS" (pure shear) test specimen. It consists in determining, once the test specimen has been notched, the crack propagation rate "PR" (nm/cycle) as a function of the energy release rate "E" (J/m$^2$). The experimental range covered by the measurement is comprised in the range −20° C. and +150° C. in terms of temperature, in an atmosphere of air or of nitrogen. The stressing of the test specimen is an imposed dynamic movement with an amplitude of between 0.1 mm and 10 mm in the form of an impulsive stress loading ("haversine" tangent signal) with a rest time equal to the duration of the impulse; the frequency of the signal is of the order of 10 Hz on average.

The measurement comprises 3 parts:

An accommodation of the "PS" test specimen, of 1000 cycles at 27% deformation.

Energy characterization in order to determine the "E"=f (deformation) law. The energy release rate "E" is equal to W0*h0, with W0=energy supplied to the material per cycle and per unit volume and h0=initial height of the test specimen. Exploitation of the "force/displacement" acquisitions thus gives the relationship between "E" and the amplitude of the stress loading.

Measuring the cracking, after the notching of the "PS" test specimen. The data collected result in the determination of the crack propagation rate "PR" as a function of the applied stress level "E".

The inventors have notably demonstrated that the presence of at least one layer of circumferential reinforcing elements contributes to less of a change in cohesion of the layer C. Specifically, since the more conventional tire designs notably comprise layers of rubber compound placed between the ends of the working crown layers with elastic modulus values under tension at 10% elongation greater than 8.5 MPa, this leads to a change in the cohesion of the said layers of rubber compound placed between the ends of the working crown layers, this change having a tendency to be for the worse. The inventors note that the presence of at least one layer of circumferential reinforcing elements that limits the shear stresses between the ends of the working crown layers and also limits the increases in temperature leads to a small change in the cohesion of the layer C. The inventors thus consider that the cohesion of the layer C, which is lower than that which exists in more conventional tire designs, is satisfactory in the tire design according to the invention.

The inventors have also been able to demonstrate that choosing a second layer S having a complex shear modulus G*, measured at 10% and 60° C. on the return cycle of more than 1.35 MPa, gives dynamic properties and notably cornering stiffness properties to the tire that are at least as good as those of a conventional tire comprising a first layer C having stiffness moduli greater than 9 MPa. Indeed the inventors have been able to demonstrate that the presence of a layer of circumferential reinforcing elements which gives additional stiffness to the tire partially alleviates the loss of cornering stiffness caused by the choice of a first layer C having stiffness moduli less than 8 MPa, and that the features listed hereinabove for the second layer S make a notable contribution to this cornering stiffness property.

Specifically, and in a way that is entirely unexpected to a person skilled in the art, the properties of the second layer S of polymer compound, the said layer S being positioned in contact with the carcass reinforcement and with at least one layer of the crown reinforcement, have an appreciable influence on the cornering stiffness properties. The presence of the layer of circumferential reinforcing elements would appear to be able to influence the cornering stiffness properties sufficiently and, in theory, optimally, on account of the stiffness it confers upon the tire. Tests carried out have demonstrated that the properties of the second layer S have an appreciable effect on the cornering stiffness properties of the tire and allow these to be improved even when a layer of circumferential reinforcing elements is present. The inventors have further demonstrated that the choice of this second layer S of polymer compound does not impair the performance in terms of the stresses experienced by the tire when driving in a straight line.

Advantageously according to an embodiment of the invention, the complex shear modulus G*, measured at 10% and 60° C. on the return cycle, of the second layer S is less than 2 MPa, so that the thermal properties of the tire are not excessively modified in case that impairs the endurance properties of the tire and the rolling resistance properties thereof.

Advantageously too, the maximum value of $\tan(\delta)$, denoted $\tan(\delta)$max, of the second layer S is less than 0.100.

According to one preferred embodiment of the invention, the second layer S of polymer compound comprises a reinforcing filler made up of:
a) either carbon black with a BET specific surface area of between 30 and 160 m²/g, used in a content equal to or greater than 15 phr and less than or equal to 28 phr,
b) or a white filler of the silica and/or alumina type comprising SiOH and/or AlOH surface functional groups selected from the group formed of precipitated or pyrogenated silicas, aluminas or aluminosilicates or alternatively carbon blacks modified during or after synthesis with a specific surface area of between 30 and 260 m²/g used at a content greater than or equal to 15 phr and less than or equal to 55 phr,
c) or a blend of carbon black described at (a) and a white filler described at (b), in which the overall filler content is greater than or equal to 15 phr and less than equal to 50 phr and the white filler phr content is greater than or equal to the phr content of carbon black minus 5.

The inventors have further demonstrated that the second layer S has enough cohesion to limit the spread of cracks that begin when an object pierces the tread of the tire. The inventors also demonstrate the reaching of a tire performance compromise combining the dynamic properties, notably the cornering stiffness, the rolling resistance and the endurance properties even in the abovementioned case when an object pierces the tread of the tire.

For preference, the thickness of the first layer C of rubber compound, measured at the end of the least-wide working crown layer of the two working crown layers considered, will preferably be comprised between 30% and 80% of the overall thickness of rubber compound between generatrices of cords respectively of the two working crown layers: a thickness less than 30% not making it possible to obtain decisive results, and a thickness greater than 80% being of no benefit towards improving the resistance to separation between layers and disadvantageous from a cost standpoint.

According to one preferred embodiment of the invention, with the said at least two working crown layers having unequal axial widths, a third layer P of rubber compound separates the axially widest working crown layer from the end of the second working crown layer, the axially outer end of the said third layer P of rubber compound being situated at a distance away from the equatorial plane of the tire that is less than the distance separating the end of the axially widest working crown layer from the said plane, the said third layer P of rubber compound being separate at least in part from the skim L of the said second working crown layer by the first layer C of rubber compounds, and the said first and second layers of rubber compound P and C and the said skim L respectively having elastic modulus values under tension at 10% elongation denoted MP, MC and ML, such that ML≥MC>MP.

The combination of the layers of rubber compound C and P, because of the choice of respective elastic modulus values MC and MP thereof, further contributes towards improving the resistance of the crown design to separation between the ends of the working crown layers. The stiffness gradient thus created appears to further favour preventing or, at the very least, delaying, the onset of cracking of the rubber compounds at the end of the axially narrowest working crown layer.

As before, the sum of the respective thicknesses of the layers of rubber compound C and P, measured at the end of the least wide layer of the two working crown layers considered, will preferably be comprised between 30% and 80% of the overall thickness of rubber compound between generatrices of cords of the two working crown layers respectively.

According to one advantageous embodiment of the invention, the axially widest working crown layer is radially on the inside of the other working crown layers.

According to this embodiment, the said first layer of rubber compound C is thus at least partially radially outside said third layer of rubber compound P.

For preference also, the axial width D of the layer of rubber compound C and/or P comprised between the axially innermost end of the said layer of rubber compound C and/or P and the end of the axially least-wide working crown layer is such that:

$$3 \cdot \phi_2 \leq D \leq 25 \cdot \phi_2$$

where $\phi_2$ is the diameter of the reinforcing elements of the axially least-wide working crown layer. Such a relationship defines a zone of engagement between the layer of rubber compound C and/or P and the axially least-wide working crown layer. Such an engagement below a value equal to three times the diameter of the reinforcing elements of the axially least-wide working crown layer may prove insufficient for obtaining decoupling of the working crown layers in order notably to obtain a reduction in the stresses at the end of the axially least-wide working crown layer. A value for this engagement that is greater than twenty times the diameter of the reinforcing elements of the axially least-wide working layer may lead to too great a reduction in the cornering stiffness of the crown reinforcement of the tire.

The distance d is measured from cord to cord, namely between the cord of a first working layer and the cord of a second working layer. In other words, this distance d encompasses the thickness of the layer of rubber compound C and/or P and the respective thicknesses of the skim rubber compounds radially on the outside of the cords of the radially inner working layer and radially on the inside of the cords of the radially outer working layer.

The various thickness measurements are taken on a cross section of a tire, the tire therefore being in an uninflated state.

According to an advantageous embodiment of the invention, the tire comprises a fourth layer G of polymer compound radially between the carcass reinforcement and the radially innermost layer of reinforcing elements of the crown reinforcement of axial width at least equal to 70% of the width of the radially innermost layer of reinforcing elements of the crown reinforcement and having a complex shear modulus G*, measured at 10% and 60° C. on the return cycle, greater than 1.35 MPa.

According to a preferred embodiment of the invention, the axial width of the said fourth layer G is at most equal to the width of the radially innermost layer of reinforcing elements of the crown reinforcement and, for preference, at least equal to 90% of the width of the radially innermost layer of reinforcing elements of the crown reinforcement.

Preferably also according to this embodiment of the invention, the thickness, measured in the radial direction, of the said fourth layer G is greater than $\phi$ and preferably less than $3\phi$, $\phi$ being the diameter of the reinforcing elements of the radially innermost layer of crown reinforcement.

The inventors have also been able to demonstrate that the fourth layer G of polymer compound thus defined further contributes to improving the cornering stiffness properties of the tire by supplementing the layer of circumferential reinforcing elements and the second layer S of polymer compound.

Advantageously according to an embodiment of the invention, the complex shear modulus G*, measured at 10% and at 60° C. on the return cycle, of the fourth layer G is less than 2 MPa, such that the thermal properties of the tire are not excessively modified in case that impairs the endurance properties of the tire and the rolling resistance properties thereof.

Advantageously too, the maximum value of tan($\delta$), denoted tan($\delta$)max, of the fourth layer G is less than 0.100.

According to one preferred embodiment of this alternative form of the invention, the fourth layer G of polymer compound comprises a reinforcing filler made up of:
a) either carbon black with a BET specific surface area of between 30 and 160 m²/g, used in a content equal to or greater than 15 phr and less than or equal to 28 phr,
b) or a white filler of the silica and/or alumina type comprising SiOH and/or AlOH surface functional groups selected from the group formed of precipitated or pyrogenated silicas, aluminas or aluminosilicates or alternatively carbon blacks modified during or after synthesis with a specific surface area of between 30 and 260 m²/g used at a content greater than or equal to 15 phr and less than or equal to 55 phr,
c) or a blend of carbon black described at (a) and a white filler described at (b), in which the overall filler content is greater than or equal to 15 phr and less than equal to 50 phr and the white filler phr content is greater than or equal to the phr content of carbon black minus 5.

Advantageously, the polymer compound that makes up the fourth layer G is identical to the polymer compound that makes up the second layer S.

According to one embodiment of the invention, the elastic modulus under tension at 10% elongation of at least one skim layer of at least one working crown layer is less than 8.5 MPa and the maximum tan($\delta$) value, denoted tan($\delta$)$_{max}$, of the said at least one skim layer of at least one working crown layer is less than 0.100.

Usually, the elastic modulus values under tension at 10% elongation of the skim layers of the working crown layers are greater than 10 MPa. Such elastic modulus values are required in order to make it possible to limit the extent to which the reinforcing elements of the working crown layers are placed in compression notably when the vehicle is following a sinuous path, when manoeuvring in car parks or even when negotiating roundabouts. Specifically, shear in the axial direction, which is applied to the tread in the region of the contact patch causes the reinforcing elements of a working crown layer to be placed in compression.

The inventors have also been able to demonstrate that the layer of circumferential reinforcing elements allows elastic modulus values to be lower without detracting from the endurance properties of the tire because of the compression experienced by the reinforcing elements of the working crown layers as described hereinabove.

As in the case of the first layer of rubber compound C, the use of at least one skim layer of at least one working crown layer the elastic modulus of which is less than or equal to 8.5 MPa, and the tan($\delta$)$_{max}$ value of which is less than 0.100 is going to make it possible to improve the properties of the tire in terms of rolling resistance while at the same time maintaining satisfactory endurance properties.

The inventors have also demonstrated that the combination of a layer of circumferential reinforcing elements and of working crown layer skim layers having elastic modulus values under tension at 10% elongation of less than 8.5 MPa makes it possible to maintain a satisfactory ply-steer effect.

The ply-steer effect corresponds to the appearance of a transverse thrust under zero cornering as a result of the structure of the tire and notably as a result of the presence of working crown layer reinforcing elements that make an angle with the circumferential direction of between 10 and 45° which cause the said thrust to appear as they deform as the tire is squashed against the ground in the contact patch when the tire is being driven on.

The inventors have thus illustrated that the ply-steer effect, which is modified through the presence of a layer of circumferential reinforcing elements, experiences a drop in variation because of the choice of low elastic modulus values for the skim compounds of the working layers. Specifically, transverse thrust increases as a result of the presence of a layer of circumferential reinforcing elements as compared to the same tire without the said layer of circumferential reinforcing elements, and this increase is lessened by choosing elastic modulus values that are lower than those usually employed for the skim compounds of the working layers.

Finally, the combination of the layer of circumferential reinforcing elements and of the second layer S, or even the fourth layer G, having a complex shear modulus G*, measured at 10% and 60° C. on the return cycle, greater than 1.35 MPa also makes it possible to maintain satisfactory cornering stiffness properties for the tire when at least one skim layer of at least one working crown layer has an elastic modulus less than or equal to 8.5 MPa, such an elastic modulus value being penalizing with regard to the cornering stiffness properties of the tire.

According to one preferred embodiment of the invention, the said at least one skim layer of at least one working crown layer is an elastomer compound based on natural rubber or on synthetic polyisoprene with a predominance of cis-1,4 chains and possibly of at least one other diene elastomer, the natural rubber or the synthetic polyisoprene in the event of a blend being present at a content that predominates over the content of the other diene elastomer or elastomers used and of a reinforcing filler made up of:

a) either carbon black of BET specific surface area greater than 60 m$^2$/g,
   i. used at a content of between 20 and 40 phr when the oil absorption number (COAN) of the carbon black is greater than 85,
   ii. used at a content of between 20 and 60 phr when the oil absorption number (COAN) of the carbon black is less than 85,
b) or carbon black of BET specific surface area less than 60 m$^2$/g, whatever its oil absorption number, used at a content of between 20 and 80 phr and preferably of between 30 and 50 phr,
c) or a white filler of the silica and/or alumina type comprising SiOH and/or AlOH functional groups at the surface, selected from the group formed of precipitated or pyrogenated silicas, aluminas or aluminosilicates or alternatively still, carbon blacks modified during or after synthesis with BET specific surface area of between 30 and 260 m$^2$/g used at a content of between 20 and 80 phr and preferably of between 30 and 50 phr,
d) or a blend of carbon black described at (a) and/or of carbon black described at (b) and/or of a white filler described at (c), in which blend the overall filler content is between 20 and 80 phr and preferably between 40 and 60 phr.

If a clear filler or a white filler is being used, it is necessary to use a coupling agent and/or a covering agent selected from the agents known to those skilled in the art. Mention may be made, as examples of preferred coupling agents, of alkoxysilane sulphides of the bis(3-trialkoxysilylpropyl) polysulphide type and among these in particular of bis(3-triethoxysilylpropyl) tetrasulphide, sold by Degussa under the name Si69 for the pure liquid product and the name X50S for the solid product (50/50 by weight blend with N330 black). Mention may be made, as examples of covering agents, of a fatty alcohol, an alkylalkoxysilane, such as a hexadecyltrimethoxysilane or hexadecyltriethoxysilane respectively sold by Degussa under the names Si116 and Si216, diphenylguanidine, a polyethylene glycol or a silicone oil, optionally modified by means of OH or alkoxy functional groups. The coating and/or coupling agent is used in a proportion of ≥1/100 and ≤20/100 by weight to the filler, and preferably in the range from 2/100 to 15/100 if the clear filler forms the whole of the reinforcing filler and in the range from 1/100 to 20/100 if the reinforcing filler is formed by a blend of carbon black and clear filler.

Other examples of reinforcing fillers that have the morphology and surface SiOH and/or AlOH functional groups of materials of the silica and/or alumina type described hereinabove and that can be used according to the invention as a partial or complete replacement for these include carbon blacks modified either during synthesis by addition, to the oil fed to the oven, of a silicon and/or aluminium compound, or after synthesis by the addition, to an aqueous suspension of carbon black in a solution of sodium silicate and/or aluminate, of an acid, so as to at least partially cover the surface of the carbon black with SiOH and/or AlOH functional groups. Mention may be made, as nonlimiting examples of carbon-based fillers of this type with SiOH and/or AlOH functional groups at the surface, of the fillers of CSDP type described in Conference No. 24 of the ACS Meeting, Rubber Division, Anaheim, Calif., 6-9 May 1997, and also those of Patent Application EP-A-0 799 854.

When a clear filler is used as the only reinforcing filler, the hysteresis and cohesion properties are obtained by using a precipitated or pyrogenated silica or alternatively by using a precipitated alumina or even an aluminosilicate with a BET specific surface area comprised between 30 and 260 m$^2$/g. Mention may be made, as nonlimiting examples of filler of this type, of the silicas KS404 from Akzo, Ultrasil VN2 or VN3 and BV3370GR from Degussa, Zeopol 8745 from Huber, Zeosil 175MP or Zeosil 1165MP from Rhodia, HI-SIL 2000 from PPG, and the like.

Included among the diene elastomers that can be used as a blend with the natural rubber or a synthetic polyisoprene with a predominance of cis-1,4 chains, mention may be made of a polybutadiene (BR), preferably with a predominance of cis-1,4 chains, a stirene-butadiene copolymer (SBR) solution or emulsion, a butadiene-isoprene copolymer (BIR) or, alternatively still, a stirene-butadiene-isoprene terpolymer (SBIR). These elastomers can be elastomers modified during polymerization or after polymerization by means of branching agents, such as a divinylbenzene, or star-branching agents, such as carbonates, halotins or halosilicons, or alternatively by means of functionalization agents resulting in a grafting, to the chain or at the chain end, of oxygen-comprising carbonyl or carboxyl functional groups or else of an amine functional group, such as, for example, by the action of dimethylaminobenzophenone or diethylaminobenzophenone. In the case of blends of natural rubber or synthetic polyisoprene predominantly comprising cis-1,4 chains with one or more of the diene elastomers mentioned above, the natural rubber or the synthetic polyisoprene is preferably used at a predominant content and more preferably at a content of greater than 70 phr.

Advantageously also according to an embodiment of the invention, the difference between the elastic modulus under tension at 10% elongation of the first layer C and the elastic modulus under tension at 10% elongation of the said at least one skim layer of at least one working crown layer is less than 2 MPa.

According to a first embodiment, the elastic modulus of the skim of at least the narrowest working crown layer is greater than that of the said first layer of rubber compound C so that the stack of the said layers exhibits an elastic modulus gradient favourable to combating the initiation of cracks at the ends of the narrowest working crown layer.

According to a second embodiment, the elastic modulus values of the skims of the working crown layers and that of the said first layer of rubber compound C are identical, and advantageously also, the rubber compounds are the same in order to simplify the industrial conditions under which the tire is manufactured.

According to one advantageous embodiment of the invention, the said reinforcing elements of at least one working crown layer are cords with saturated layers, at least one internal layer being sheathed by a layer made up of a polymer composition such as a non-crosslinkable, crosslinkable or crosslinked rubber composition preferably based on at least one diene elastomer.

Cords referred to as "layered" cords or "multilayered" cords are cords made up of a central nucleus and of one or more practically concentric layers of strands or threads arranged around this central nucleus.

Within the meaning of the invention, a saturated layer of a layered cord is a cord made up of threads in which there is not enough space to add at least one additional thread.

The inventors have been able to demonstrate that the presence of the cords as just described by way of reinforcing elements for the working crown layers are able to contribute to better performance in terms of endurance.

Specifically, it would appear, as explained hereinabove, that the rubber compounds of the skims of the working layers make it possible to reduce the rolling resistance of the tire. That results in a lowering of the temperatures of these rubber compounds, when the tire is being used, which may lead to lower protection of the reinforcing elements with regard to the phenomenon of oxidation under certain conditions of use of the tire. Specifically, the properties of the rubber compounds relating to their ability to block oxygen decrease with temperature and the presence of oxygen may lead to progressive degeneration of the mechanical properties of the cords, for the most harsh running conditions, and may adversely affect the life of these cords.

The presence of the rubber sheath within the cords described hereinabove compensates for this potential risk of oxidation of the reinforcing elements, as the sheath contributes to blocking the oxygen.

The expression "composition based on at least one diene elastomer" means, in the known way, that the composition contains a predomination (i.e. a fraction by mass in excess of 50%) of this or these diene elastomer or elastomers.

It will be noted that the sheath according to an embodiment of the invention extends continuously around the layer that it covers (which means to say that this sheath is continuous in the "orthoradial" direction of the cord, which direction is perpendicular to its radius) so as to form a continuous sleeve the cross section of which is advantageously practically circular.

It will also be noted that the rubber composition of this sheath may be crosslinkable or crosslinked, which means to say that by definition it comprises a crosslinking system suited to allowing the composition to crosslink when it is cured (i.e. to harden rather than to melt); thus, this rubber composition may be qualified as unmeltable, because it cannot be melted whatever the temperature to which it is heated.

The term "diene" elastomer or rubber is understood to mean, in a known way, an elastomer which is based, at least partially (i.e. a homopolymer or a copolymer), on diene monomers (monomers bearing two conjugated or non-conjugated carbon-carbon double bonds).

For preference, the crosslinking system for the rubber sheath is a system referred to as a vulcanization system, namely one based on sulphur (or a sulphur donor agent) and a primary vulcanization accelerator. Various known secondary accelerators or vulcanization activators may be added to this basic vulcanization system.

The rubber composition of the sheath according to an embodiment of the invention may comprise, in addition to the said crosslinking system, all the customary ingredients that can be used in rubber compositions for tires, such as reinforcing fillers based on carbon black and/or on an inorganic reinforcing filler such as silica, antiageing agents, for example antioxidants, extension oils, plasticizers or agents that improve the workability of the compositions in the raw state, methylene acceptors and donors, resins, bis-maleimides, known adhesion promoting systems of the "RFS" (resorcinol-formaldehyde-silica) type or metal salts, notably cobalt salts.

By way of preference, the composition of this sheath is chosen to be identical to the composition used for the skim layer of the working crown layer that the cords are intended to reinforce. Thus, there is no problem of potential incompatibility between the respective materials of the sheath and of the rubber matrix.

According to an embodiment of the invention, the said cords of at least one working crown layer are cords of [L+M] layer construction, comprising a first layer C1 of L threads of diameter $d_1$ wound together in a helix at a pitch $p_1$ with L ranging from 1 to 4, surrounded by at least one intermediate layer C2 of M threads of diameter $d_2$ wound together in a helix at a pitch $p_2$ with M ranging from 3 to 12, a sheath made of a noncrosslinkable, crosslinkable or crosslinked rubber composition based on at least one diene elastomer covering, in the construction, the said first layer C1.

For preference, the diameter of the threads of the first layer of the internal layer (C1) is comprised between 0.10 and 0.5 mm and the diameter of the threads of the external layer (C2) is comprised between 0.10 and 0.5 mm.

For preference also, the pitch of the helix at which the said threads of the external layer (C2) are wound is comprised between 8 and 25 mm.

Within the meaning of the invention, the helix pitch represents the length, measured parallel to the axis of the cord, after which a thread of this pitch has effected a complete turn about the axis of the cord; thus, if the axis is sectioned on two planes perpendicular to the said axis and separated by a length equal to the pitch of a thread of a layer of which the cord is made, the axis of this thread in these two planes occupies the same position on the two circles corresponding to the layer of the thread considered.

Advantageously, the cord is ascertained to have one, or even more preferably, all, of the following characteristics:
the layer C2 is a saturated layer, which means to say that there is not enough space in this layer for at least one (N+1)th thread of diameter $d_2$ to be added, N then representing the maximum number of threads that can be wound in a single layer around the layer C1;
the rubber sheath also covers the internal layer C1 and/or separates adjacent pairs of threads of the external layer C2;
the rubber sheath covers practically half of the radially internal circumference of each thread of the layer C2, such that it separates adjacent pairs of threads of this layer C2.

Preferably, the rubber sheath has a mean thickness ranging from 0.010 mm to 0.040 mm.

In general, the said cords according to the invention can be produced using any type of metal thread, notably made of steel, for example threads made of carbon steel and/or threads of stainless steel. Use is preferably made of carbon steel but it is, of course, possible to use other steels or other alloys.

Where a carbon steel is used, its carbon content (% by weight of steel) is preferably comprised between 0.1% and 1.2%, more preferably from 0.4% to 1.0%; these contents represent a good compromise between the mechanical properties required for the tire and the workability of the thread. It should be noted that a carbon content of between 0.5% and 0.6% ultimately makes such steels less expensive because they become easier to draw. Another advantageous embodiment of the invention can also consist, depending on the applications targeted, in using steels having a low carbon content, for example of between 0.2% and 0.5%, due in particular to a lower cost and to a greater ease of drawing.

The said cords according to an embodiment of the invention may be obtained using various techniques known to those skilled in the art, for example in two steps, first of all by sheathing the core or layer C1 using an extrusion head, which step is followed in a second stage by a final operation of cabling or twisting the remaining M threads (layer C2) around the layer C1 thus sheathed. The problem of bonding in the raw state posed by the rubber sheath during the optional intermediate winding and unwinding operations can be solved in a way known to a person skilled in the art, for example by the use of an interposed plastic film.

Such cords of at least one working crown layer are, for example, selected from the cords described in patent applications WO 2006/013077 and WO 2009/083212.

According to an advantageous embodiment of the invention, the layer of circumferential reinforcing elements has an axial width greater than 0.5×W.

W is the maximum axial width of the tire when the latter is mounted on its service rim and inflated to its recommended pressure.

The axial widths of the layers of reinforcing elements are measured on a cross section of a tire, the tire therefore being in an uninflated state.

According to a preferred embodiment of the invention, at least two working crown layers have different axial widths, the difference between the axial width of the axially widest working crown layer and the axial width of the axially least-wide working crown layer being comprised between 10 and 30 mm.

According to a preferred embodiment of the invention, the layer of circumferential reinforcing elements is placed radially between two working crown layers.

According to this embodiment of the invention, the layer of circumferential reinforcing elements makes it possible to limit more significantly the extent to which the reinforcing elements of the working crown layers are placed under compression than a similar layer placed radially on the outside of the working layers is able to achieve. It is preferably separated radially from the carcass reinforcement by at least one working layer so as to limit the stress loadings on the said reinforcing elements and avoid excessively fatiguing them.

Advantageously too according to an embodiment of the invention, the axial widths of the working crown layers radially adjacent to the layer of circumferential reinforcing elements are greater than the axial width of the said layer of circumferential reinforcing elements and, for preference, the said working crown layers adjacent to the layer of circumferential reinforcing elements are, on either side of the equatorial plane and in the immediate axial continuation of the layer of circumferential reinforcing elements, coupled over an axial width and then decoupled by the said first layer of rubber compound C at least over the remainder of the width that the said two working layers have in common.

The presence of such couplings between the working crown layers adjacent to the layer of circumferential reinforcing elements allow a reduction in the tensile stresses acting on the axially outermost circumferential elements situated closest to the coupling.

According to one advantageous embodiment of the invention, the reinforcing elements of at least one layer of circumferential reinforcing elements are metallic reinforcing elements having a secant modulus at 0.7% elongation comprised between 10 and 120 GPa and a maximum tangent modulus of less than 150 GPa.

According to a preferred embodiment, the secant modulus of the reinforcing elements of 0.7% elongation is less than 100 GPa and greater than 20 GPa, preferably comprised between 30 and 90 GPa and more preferably still, less than 80 GPa.

Also preferably, the maximum tangent modulus of the reinforcing elements is less than 130 GPa and more preferably less than 120 GPa.

The modulus values expressed hereinabove are measured on a curve of tensile stress as a function of elongation determined with a preload of 20 MPa, divided by the cross section of metal of the reinforcing element, the tensile stress corresponding to a measured tension divided by the cross section of metal of the reinforcing element.

The modulus values for the same reinforcing elements may be measured from a curve of tensile stress as a function of elongation which is determined with a preload of 10 MPa divided by the overall cross section of the reinforcing element, the tensile stress corresponding to a measured tension divided by the overall cross section of the reinforcing element. The overall cross section of the reinforcing element is the cross section of a composite element made up of metal and of rubber, the latter notably having penetrated the reinforcing element during the tire curing phase.

According to this formulation relating to the overall cross section of the reinforcing element, the reinforcing elements of the axially outer parts and of the central part of at least one layer of circumferential reinforcing elements are metallic reinforcing elements having a secant modulus of 0.7% elongation comprised between 5 and 60 GPa and a maximum tangent modulus of less than 75 GPa.

According to one preferred embodiment, the secant modulus of the reinforcing elements at 0.7% elongation is less than 50 GPa and greater than 10 GPa, preferably comprised between 15 and 45 GPa, and more preferably still, less than 40 GPa.

Also preferably, the maximum tangent modulus of the reinforcing elements is less than 65 GPa and more preferably less than 60 GPa.

According to one preferred embodiment, the reinforcing elements of at least one layer of circumferential reinforcing elements are metallic reinforcing elements having a curve of tensile stress as a function of relative elongation that has shallow gradients for small elongations and a substantially constant and steep gradient for greater elongations. Such reinforcing elements of the additional ply are normally known as "bimodulus" elements.

According to a preferred embodiment of the invention, the substantially constant and steep gradient appears upwards of a relative elongation of between 0.1% and 0.5%.

The various characteristics of the reinforcing elements mentioned above are measured on reinforcing elements taken from tires.

Reinforcing elements more particularly suited to the creation of at least one layer of circumferential reinforcing elements according to the invention are, for example, assemblies of formula 21.23, the makeup of which is 3×(0.26+6× 0.23) 4.4/6.6 SS; this stranded cord being made up of 21 elementary threads of formula 3×(1+6), with 3 strands twisted together, each one made up of 7 threads, one thread forming a central core of a diameter equal to $26/100$ mm, and 6 wound threads of a diameter equal to $23/100$ mm Such a cord has a secant modulus of 0.7% equal to 45 GPa and a maximum tangent modulus equal to 98 GPa, these being measured on a curve of tensile stress as a function of elongation determined with a preload of 20 MPa divided by the cross section of metal of the reinforcing element, the tensile stress corresponding to a measured tension divided by the cross section of metal of the reinforcing element. On a curve of tensile stress as a function of elongation determined with a preload of 10 MPa divided by the overall cross section of the reinforcing element, the tensile stress corresponding to a measured tension divided by the overall cross section of the reinforcing element, this cord of formula 21.23 has a secant modulus of 0.7% equal to 23 GPa and a maximum tangent modulus equal to 49 GPa.

In the same way, another example of reinforcing elements is an assembly of formula 21.28, the construction of which is 3×(0.32+6×0.28) 6.2/9.3 SS. This cord has a secant modulus at 0.7% equal to 56 GPa and a maximum tangent modulus equal to 102 GPa, these measured on a curve of tensile stress as a function of elongation determined with a preload of 20 MPa divided by the cross section of metal of the reinforcing element, the tensile stress corresponding to a measured tension divided by the cross section of metal of the reinforcing element. On a curve of tensile stress as a function of elongation determined with a preload of 10 MPa divided by the overall cross section of the reinforcing element, the tensile stress corresponding to a measured tension divided by the overall cross section of the reinforcing element, this cord of formula 21.28 has a secant modulus of 0.7% equal to 27 GPa and a maximum tangent modulus equal to 49 GPa.

The use of such reinforcing elements in at least one layer of circumferential reinforcing elements notably makes it possible to maintain satisfactory stiffnesses of the layer even after the shaping and curing stages in conventional manufacturing methods.

According to a second embodiment of the invention, the circumferential reinforcing elements may be formed of metallic elements that are inextensible and cut in such a way as to form portions of a length very much less than the circumference of the least-long layer, but preferably greater than 0.1 times the said circumference, the cuts between portions being axially offset from one another. Preferably again, the tensile modulus of elasticity per unit of width of the additional layer is less than the tensile modulus of elasticity, measured under the same conditions, of the most extensible working crown layer. Such an embodiment makes it possible, in a simple way, to confer upon the layer of circumferential reinforcing elements a modulus that can easily be adjusted (by means of the choice of spacings between portions of the same row) but that is in all cases lower than the modulus of the layer made up of the same metallic elements but continuous, the modulus of the additional layer being measured on a vulcanized layer of cut elements, taken from the tire.

According to a third embodiment of the invention, the circumferential reinforcing elements are wavy metallic elements the ratio a/λ of the amplitude of the waves to the wavelength being at most equal to 0.09. Preferably, the tensile modulus of elasticity per unit width of the additional layer is less than the tensile modulus of elasticity, measured under the same conditions, of the most extensible working crown layer.

The metallic elements are preferably steel cords.

According to a preferred embodiment of the invention, the reinforcing elements of the working crown layers are inextensible metal cords.

The invention also advantageously, in order to reduce the tensile stresses acting on the axially outermost circumferential elements, plans for the angle formed with the circumferential direction by the reinforcing elements of the working crown layers to be less than 30° and preferably less than 25°.

One preferred embodiment of the invention also provides for the crown reinforcement to be supplemented radially on the outside by at least one additional layer, referred to as a protective layer, of reinforcing elements, referred to as elastic reinforcing elements, that are oriented with respect to the circumferential direction at an angle of between 10° and 45° and in the same direction as the angle formed by the inextensible elements of the working layer radially adjacent to it.

The protective layer may have an axial width less than the axial width of the least-wide working layer. The said protective layer can also have an axial width greater than the axial width of the narrowest working layer, such that it overlaps the edges of the narrowest working layer and, when it is the layer radially above which is narrowest, such that it is coupled, in the axial extension of the additional reinforcement, with the widest working crown layer over an axial width in order thereafter, axially on the outside, to be decoupled from the said widest working layer by profiled elements having a thickness at least equal to 2 mm. The protective layer formed of elastic reinforcing elements can, in the abovementioned case, on the one hand be optionally decoupled from the edges of the said narrowest working layer by profiled elements having a thickness substantially less than the thickness of the profiled elements separating the edges of the two working layers and, on the other hand, have an axial width less than or greater than the axial width of the widest crown layer.

According to any one of the embodiments of the invention mentioned above, the crown reinforcement may furthermore be supplemented, radially on the inside between the carcass reinforcement and the radially internal working layer closest to said carcass reinforcement, by a triangulation layer made of metal inextensible reinforcing elements that are made of steel and form, with the circumferential direction, an angle of more than 60° and in the same direction as the angle formed by the reinforcing elements of the radially closest layer of the carcass reinforcement.

The tire according to the invention as has just been described therefore has a rolling resistance that is an improvement on conventional tires while at the same time maintaining comparable performance in terms of endurance and wear and cornering stiffness properties that are likewise comparable.

Furthermore, the lower elastic modulus values for the various rubber compounds mean that the crown of the tire can be softened thereby limiting the risk of attack on the crown and of corrosion of the reinforcing elements of the layers of crown reinforcement when, for example, stones become retained in the bottoms of the tread patterns.

BRIEF DESCRIPTION OF THE DRAWINGS

Further details and advantageous features of the invention will become apparent hereinafter from the description of exemplary embodiments of the invention, with reference to FIGS. 1 to 3 which depict.

DETAILED DESCRIPTION OF THE DRAWINGS

In order to make them easier to understand, the figures are not shown to scale. The figures depict only half a view of a tire which extends symmetrically with respect to the axis XX' that represents the circumferential meridian plane, or equatorial plane, of a tire.

Figure 1:
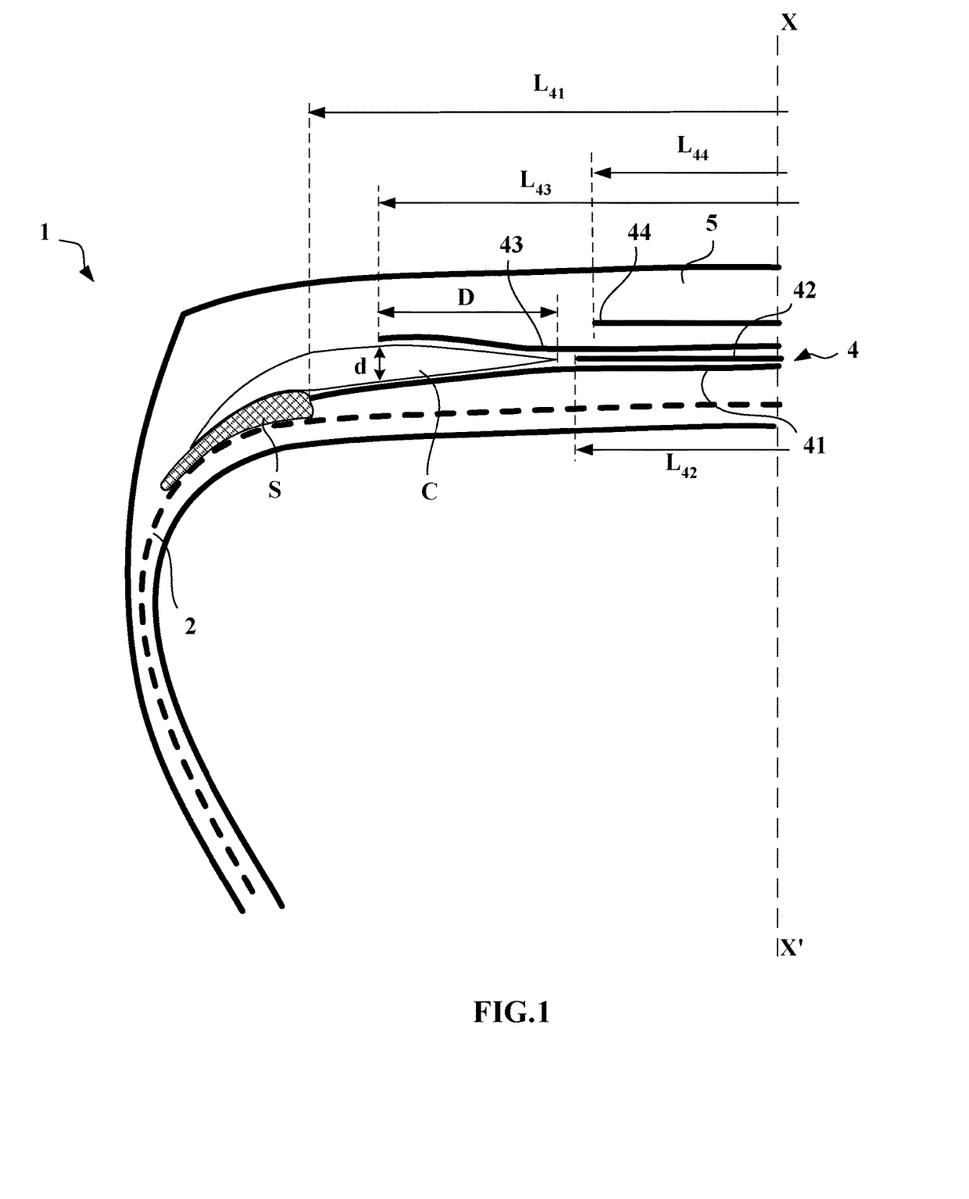
FIG. 1: a schematic meridian view of a tire according to one embodiment of the invention.

In FIG. 1, the tire 1, of size 315/70 R 22.5, has an aspect ratio H/S equal to 0.70, H being the height of the tire 1 on its mounting rim and S being its maximum axial width. The said tire 1 comprises a radial carcass reinforcement 2 fixed in two beads, not shown in the figure. The carcass reinforcement is formed of a single layer of metal cords. This carcass reinforcement 2 is hooped by a crown reinforcement 4 formed radially, from the inside to the outside:
- of a first working layer 41 formed of non-wrapped inextensible 9.28 metal cords, which are continuous across the entire width of the ply, and oriented at an angle equal to 24°,
- of a layer of circumferential reinforcing elements 42, formed of 21×23 steel metal cords, of the "bimodulus" type,
- of a second working layer 43 formed of non-wrapped inextensible 9.28 metal cords, which are continuous across the entire width of the ply, oriented at an angle equal to 24°, and crossed with the metal cords of the layer 41,
- of a protective layer 44 formed of elastic 6.35 metal cords.

The crown reinforcement is itself capped by a tread 5.

The maximum axial width of the tire is equal to 317 mm.

The axial width $L_{41}$ of the first working layer 41 is equal to 252 mm.

The axial width $L_{43}$ of the second working layer 43 is equal to 232 mm. The difference between the widths $L_{41}$ and $L_{43}$ is equal to 15 mm.

As for the axial width $L_{42}$ of the layer of circumferential reinforcing elements 42, this is equal to 194 mm.

The last crown ply 44, referred to as the protective ply, has a width $L_{44}$ equal to 124 mm.

According to the invention, a first layer of rubber compound C decouples the ends of the working crown layers 41 and 43.

The zone of engagement of the layer C between the two working crown layers 41 and 43 is defined by its thickness or, more precisely, the radial distance d between the end of the layer 43 and the layer 41 and by the axial width D of the layer C comprised between the axially inner end of the said layer C and the end of the radially outer working crown layer 43. The radial distance d is equal to 3.5 mm, namely approximately 2.1 times the diameter $\phi_2$ of the reinforcing elements of the working crown layer 43, the diameter $\phi_2$ being equal to 1.65 mm. The axial distance D is equal to 20 mm, namely approximately 12 times the diameter $\phi_2$ of the reinforcing elements of the working crown layer 43.

According to the invention, a second layer S of rubber compound is placed between the carcass reinforcement 2 and the first working layer 41.

Figure 2:
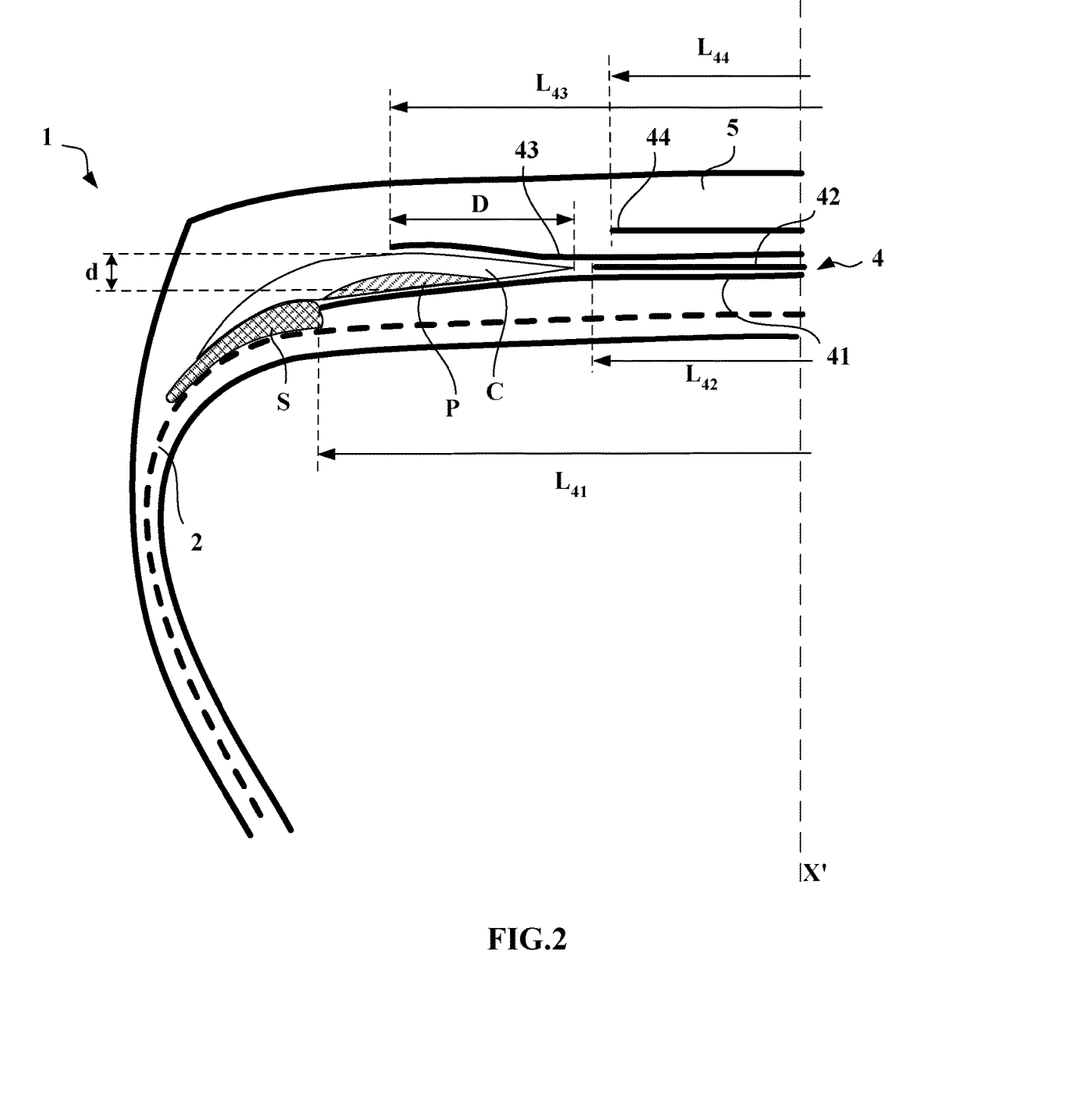
FIG. 2: a schematic meridian view of a tire according to a second embodiment of the invention.

In FIG. 2, the tire 1 differs from the one depicted in FIG. 1 in that the ends of the working crown layers 41 and 43 are decoupled by a stack of two radially superposed layers. A third layer of rubber compound P in contact with the working crown ply 41 is positioned radially between the said working crown layer 41 and the first layer of rubber compounds C such that the said third layer P caps the end of the axially narrowest working crown layer 43.

Figure 3:
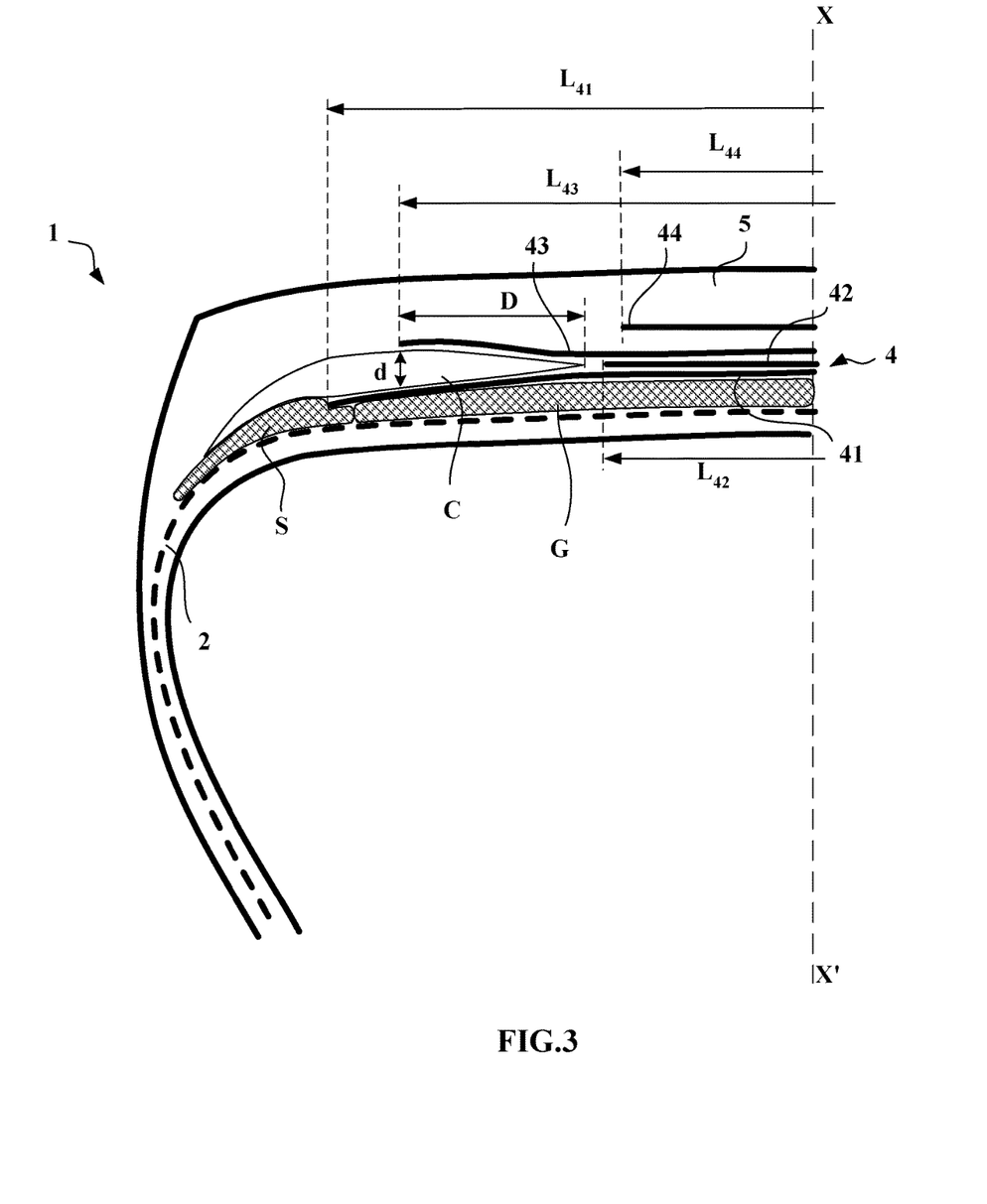
FIG. 3: a schematic meridian view of a tire according to a third embodiment of the invention.

In FIG. 3, the tire 1 differs from the one depicted in FIG. 1 in that a fourth layer G axially extends the second layer S, radially between the carcass reinforcement 2 and the first working layer 41.

Tests have been conducted with various tires produced according to the invention as depicted in FIG. 1, and compared against reference tires also as depicted in FIG. 1.

Tests have notably been performed by varying the characteristics of the compounds of the layer C, notably their elastic modulus values under tension at 10% elongation and the value of $\tan(\delta)_{max}$ and the characteristics of the compounds of the layer S, notably the complex dynamic shear modulus G*, measured at 10% and 60° C. on the return cycle.

Further tests have also been performed with tires by also varying the characteristics of the skim compounds of the working layers 41 and 43, notably their elastic modulus values under tension at 10% elongation and the $\tan(\delta)_{max}$ value, according to the invention.

The various compounds used are listed below.

| | Compound R1 | Compound R2 | Compound R3 | Compound 1 | Compound 2 | Compound 3 | Compound 4 | Compound 5 | Compound 6 |
|---|---|---|---|---|---|---|---|---|---|
| NR | 100 | 100 | 100 | 100 | 100 | 100 | 100 | 100 | 100 |
| Black N347 | 52 | 50 | | | 33 | | | | |
| Black N683 | | | | | | | 44 | 30 | |
| Black N326 | | | | 47 | | | | | 5 |
| Black N330 | | | 35 | | | | | | |
| Silica 165G | | | | | | 46 | | | 40 |
| Antioxidant (6PPD) | 1 | 1.8 | 0.7 | 1.5 | 1 | 2 | 1 | 1 | 1.5 |
| Stearic acid | 0.65 | 0.6 | 1.4 | 0.9 | 0.65 | 1 | 0.65 | 0.65 | 1 |
| Zinc oxide | 9.3 | 9.3 | 2.1 | 7.5 | 9.3 | 8 | 9.3 | 9.3 | 5 |
| Cobalt salt (CoAcac) | 1.12 | | | 1.12 | 1.12 | 1.1 | 1.12 | 1.12 | |
| Cobalt salt (CoAbietate) | | 4.5 | | | | | | | |
| Silane-on-black | | | | | | 8.3 | | | 5 |
| Sulphur | 6.1 | 5.6 | 2.15 | 4.5 | 6.1 | 4.8 | 6.1 | 6.1 | 1.75 |
| PEG | | | | | | | | | 2.5 |
| Accelerator DCBS | 0.93 | 0.8 | | 0.8 | 0.93 | | 0.93 | 0.93 | |
| Accelerator TBBS | | | | | | 1.01 | | | |
| Accelerator CBS | | | 1 | | | | | | 0.9 |
| Coaccelerator DPG | | | | | | 1.1 | | | 0.34 |

-continued

| | Compound R1 | Compound R2 | Compound R3 | Compound 1 | Compound 2 | Compound 3 | Compound 4 | Compound 5 | Compound 6 |
|---|---|---|---|---|---|---|---|---|---|
| Retarder CTP (PVI) | 0.25 | | 0.08 | 0.15 | 0.25 | 0.2 | 0.25 | 0.25 | |
| $MA_{10}$ (MPa) | 10.4 | 8.5 | 3.4 | 5.99 | 5.56 | 7.25 | 6.16 | 4.4 | 4.3 |
| $\tan(\delta)_{max}$ | 0.130 | 0.141 | 0.074 | 0.099 | 0.074 | 0.063 | 0.056 | 0.030 | 0.087 |
| P60 (%) | 22.9 | 24.5 | 11.3 | 18.7 | 14.9 | 13.3 | 12.2 | 8.5 | 16.5 |
| G* 10% at 60° C. (return cycle) | | | 1.25 | | | | | | 1.55 |

The values for the constituent ingredients are expressed in phr (parts by weight per hundred parts of elastomer).

Various reference tires were tested.

First reference tires T1 have a first layer C made of the compound R2, the skims of the working layers being made of the compound R1 and the second layer S of the compound R3.

Second reference tires T2 have a first layer C made of the compounds 1 to 5, the skims of the working layers being made of the compound R1 and the second layer S of the compound R3.

Third reference tires T3 have a first layer C made of the compounds 1 to 5, the skims of the working layers being made of the compounds 1 to 5 and the second layer S of the compound R3.

Various tires according to the invention were tested.

A first series of tires S1 according to the invention was produced with a first layer C made of the compounds 1 to 5, the skims of the working layers being made of the compound R1 and a second layer S made of the compound 6.

A second series of tires S2 according to the invention was produced with a first layer C made of the compounds 1 to 5, the skims of the working layers also being made of the compounds 1 to 5 and the second layer S being made of the compound 6. Certain tires of this series S2 were produced with the same compounds for the first layer C and the skims of the working layers, and others with different compounds.

First endurance tests were run on a test machine that forced each of the tires to run in a straight line at a speed equal to the maximum speed rating prescribed for the said tire (the speed index) under an initial load of 4000 kg progressively increased in order to reduce the duration of the test.

It was found that all the tires tested exhibited substantially comparable results.

Other endurance tests were conducted on a test machine that cyclically imposed a transverse loading and a dynamic overload on the tires. The tests were carried out for the tires according to the invention under conditions identical to those applied to the reference tires.

The distances covered varied from one type of tire to another, failures occurring as a result of degradation of the rubber compounds at the ends of the working layers. The results are set out in the table which follows with reference to a base 100 fixed for the reference tire T1.

| Tire T1 | Tire T2 | Tire T3 | Tire S1 | Tire S2 |
|---|---|---|---|---|
| 100 | 90 | 80 | 110 | 100 |

Other running tests were performed on unsurfaced roads made up of stones particularly aggressive towards tire treads.

These last tests demonstrated that after covering identical distances, the tires according to the invention, and more particularly those of series S2, exhibit instances of damage that are fewer in number and less substantial than those of the reference tires.

Moreover, rolling resistance measurements were taken. These measurements applied to all of the tires described hereinabove.

The results of the measurements are given in the table below: they are expressed in kg/t, a value of 100 being assigned to the tire T1.

| Tire T1 | Tire T2 | Tire T3 | Tire S1 | Tire S2 |
|---|---|---|---|---|
| 100 | 99 | 96 | 99 | 96 |

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. Tire with a radial carcass reinforcement comprising a crown reinforcement formed of at least two working crown layers of reinforcing elements, crossed from one layer to the other making with the circumferential direction angles comprised between 10° and 45°, a first layer of rubber compound being placed between at least the ends of said at least two working crown layers, a second layer of polymer compound being in contact with at least one working crown layer and in contact with the carcass reinforcement, said second layer of polymer compound extending axially as far as at least the axial end of the tread, said tread radially capping the crown reinforcement and being connected to two beads by two sidewalls, the crown reinforcement comprising at least one layer of circumferential metal reinforcing elements, wherein the elastic modulus under tension at 10% elongation of the first layer of rubber compound is less than 8 MPa wherein the maximum value of $\tan(\delta)$, denoted $\tan(\delta)_{max}$, of the first layer of rubber compound is less than 0.100, and wherein the complex dynamic shear modulus, measured at 10% and 60° C. on the return cycle, of said second layer of polymer compound is greater than 1.35 MPa, wherein the tire comprises an additional layer of polymer compound axially in contact with the second layer of polymer compound radially between the carcass reinforcement and the radially innermost layer of reinforcing elements of the crown reinforcement, and wherein the complex dynamic shear modulus, measured at 10% and 60° C. on the return cycle, of said additional layer of polymer compound is greater than 1.35 MPa.

2. The tire according to claim 1, wherein the complex shear modulus, measured at 10% and 60° C. on the return cycle, of the second layer of polymer compound is less than 2 MPa.

3. The tire according to claim 1, wherein the maximum value of tan(δ), denoted tan(δ)max, of the second layer of polymer compound is less than 0.100.

4. The tire according to claim 1, wherein the said second layer of polymer compound comprises a reinforcing filler made up of:
   a) either carbon black with a BET specific surface area of between 30 and 160 m$^2$/g, used in a content equal to or greater than 15 phr and less than or equal to 28 phr,
   b) or a white filler of the silica and/or alumina type comprising SiOH and/or AlOH surface functional groups selected from the group formed of precipitated or pyrogenated silicas, aluminas or aluminosilicates or alternatively carbon blacks modified during or after synthesis with a specific surface area of between 30 and 260 m$^2$/g used at a content greater than or equal to 15 phr and less than or equal to 55 phr,
   c) or a blend of carbon black described at (a) and a white filler described at (b), in which the overall filler content is greater than or equal to 15 phr and less than equal to 50 phr and the white filler phr content is greater than or equal to the phr content of carbon black minus 5.

5. The tire according to claim 1, wherein the first layer of rubber compound is an elastomeric compound based on natural rubber or synthetic polyisoprene with a majority of cis-1,4 chains, and possibly at least one other diene elastomer, the natural rubber or the synthetic polyisoprene in case of blending being present in a majority proportion relative to the proportion of the other diene elastomer or elastomers used, and a reinforcing filler composed of:
   a) either carbon black with a BET specific surface area greater than 60 m$^2$/g,
      i. used at a content of between 20 and 40 phr when the carbon black oil absorption number (COAN) is greater than 85,
      ii. used at a content comprised between 20 and 60 phr when the carbon black oil absorption number (COAN) is less than 85,
   b) or carbon black of BET specific surface area less than 60 m$^2$/g, whatever its oil absorption number, used at a content of between 20 and 80 phr,
   c) or a white filler of the silica and/or alumina type comprising SiOH and/or AlOH surface functional groups selected from the group formed of precipitated or pyrogenated silicas, aluminas or aluminosilicates or alternatively carbon blacks modified during or after synthesis with BET specific surface area of between 30 and 260 m$^2$/g used at a content of between 20 and 80 phr,
   d) or a blend of carbon black described at (a) and/or of carbon black described at (b) and/or a white filler described at (c), in which the overall filler content is comprised between 20 and 80 phr.

6. The tire according to claim 1, said at least two working crown layers having unequal axial widths, wherein a third layer of rubber compound separates the axially widest working crown layer from the end of the second working crown layer, wherein the axially outer end of said third layer of rubber compound is situated at a distance away from the equatorial plane of the tire that is less than the distance separating the end of the axially widest reinforcing elements ply from said plane, wherein said third layer P of rubber compound is radially separated at least in part from the skim of said working crown layer by the first layer of rubber compounds, and wherein said first and second layers of rubber compound and said skim respectively have elastic modulus values under tension at 10% elongation denoted MP, MC and ML, such that ML≥MC>MP.

7. The tire according to claim 1, wherein the complex shear modulus, measured at 10% and 60° C. on the return cycle, of the additional layer is less than 2 MPa.

8. The tire according to claim 1, wherein the maximum value of tan(δ), denoted tan(δ)max, of the additional layer is less than 0.100.

9. The tire according to claim 1, wherein said additional layer of polymer compound comprises a reinforcing filler made up of:
   a) either carbon black with a BET specific surface area of between 30 and 160 m$^2$/g, used in a content equal to or greater than 15 phr and less than or equal to 28 phr,
   b) or a white filler of the silica and/or alumina type comprising SiOH and/or AlOH surface functional groups selected from the group formed of precipitated or pyrogenated silicas, aluminas or aluminosilicates or alternatively carbon blacks modified during or after synthesis with a specific surface area of between 30 and 260 m$^2$/g used at a content greater than or equal to 15 phr and less than or equal to 55 phr,
   c) or a blend of carbon black described at (a) and a white filler described at (b), in which the overall filler content is greater than or equal to 15 phr and less than equal to 50 phr and the white filler phr content is greater than or equal to the phr content of carbon black minus 5.

10. The tire according to claim 1, said at least two working crown layers each being formed of reinforcing elements inserted between two skim layers of rubber compound, wherein the elastic modulus under tension at 10% elongation of at least one skim layer of at least one working crown layer is less than 8.5 MPa and wherein the maximum value of tan(δ), denoted tan(δ)max, of said at least one skim layer of at least one working crown layer is less than 0.100.

11. The tire according to claim 10, wherein said at least one skim layer of at least one working crown layer is an elastomer compound based on natural rubber or based on synthetic polyisoprene with a predominance of cis-1,4 chains and possibly at least one other diene elastomer, natural rubber or synthetic polyisoprene in the case of a blend being present at a content that predominates over the content of the other diene elastomer or elastomers used and of a reinforcing filler made up of:
   a) either carbon black of BET specific surface area greater than 60 m$^2$/g,
      i. used at a content of between 20 and 40 phr when the oil absorption number (COAN) of the carbon black is greater than 85,
      ii. used at a content of between 20 and 60 phr when the oil absorption number (COAN) of the carbon black is less than 85,
   b) or carbon black with BET specific surface area less than 60 m$^2$/g whatever its oil absorption number, used at a content of between 30 and 50 phr,
   c) or a white filler of the silica and/or alumina type comprising SiOH and/or AlOH functional groups at the surface, selected from the group formed of precipitated or pyrogenated silicas, aluminas or aluminosilicates or alternatively still carbon blacks modified during or after the synthesis with BET specific surface area of between 30 and 260 m$^2$/g used at a content of between 30 and 50 phr, d) or a blend of carbon black described at (a) and/or of carbon black described at (b) and/or a white filler described at (c), in which blend the overall filler content is between 40 and 60 phr.

12. The tire according to claim 10, wherein said at least one skim layer of at least one working crown layer is an elastomer compound based on natural rubber or based on synthetic polyisoprene with a predominance of cis-1,4 chains and possibly at least one other diene elastomer, natural rubber or synthetic polyisoprene in the case of a blend being present at a content that predominates over the content of the other diene elastomer or elastomers used and of a reinforcing filler made up of:
- a) either carbon black of BET specific surface area greater than 60 m$^2$/g,
  - i. used at a content of between 20 and 40 phr when the oil absorption number (COAN) of the carbon black is greater than 85,
  - ii. used at a content of between 20 and 60 phr when the oil absorption number (COAN) of the carbon black is less than 85,
- b) or carbon black with BET specific surface area less than 60 m$^2$/g whatever its oil absorption number, used at a content of between 20 and 80 phr,
- c) or a white filler of the silica and/or alumina type comprising SiOH and/or AlOH functional groups at the surface, selected from the group formed of precipitated or pyrogenated silicas, aluminas or aluminosilicates or alternatively still carbon blacks modified during or after the synthesis with BET specific surface area of between 30 and 260 m$^2$/g used at a content of between 20 and 80,
- d) or a blend of carbon black described at (a) and/or of carbon black described at (b) and/or a white filler described at (c), in which blend the overall filler content is between 20 and 80 phr.

13. The tire according to claim 1, wherein said reinforcing elements of at least one working crown layer are cords with saturated layers, at least one internal layer being sheathed by a layer made of a polymer composition such as a non-crosslinkable, crosslinkable or crosslinked rubber composition.

14. The tire according to claim 1, wherein the layer of circumferential reinforcing elements is placed radially between two working crown layers.

15. The tire according to claim 1, wherein the reinforcing elements of at least one layer of circumferential reinforcing elements are metallic reinforcing elements having a secant modulus at 0.7% elongation comprised between 10 and 120 GPa and a maximum tangent modulus less than 150 GPa.

16. The tire according to claim 1, wherein the reinforcing elements of the working crown layers are inextensible.

17. The tire according to claim 1, wherein the first layer of rubber compound is an elastomeric compound based on natural rubber or synthetic polyisoprene with a majority of cis-1,4 chains, and possibly at least one other diene elastomer, the natural rubber or the synthetic polyisoprene in case of blending being present in a majority proportion relative to the proportion of the other diene elastomer or elastomers used, and a reinforcing filler composed of:
- a) either carbon black with a BET specific surface area greater than 60 m$^2$/g,
  - i. used at a content of between 20 and 40 phr when the carbon black oil absorption number (COAN) is greater than 85,
  - ii. used at a content comprised between 20 and 60 phr when the carbon black oil absorption number (COAN) is less than 85,
- b) or carbon black of BET specific surface area less than 60 m$^2$/g, whatever its oil absorption number, used at a content of between 30 and 50 phr,
- c) or a white filler of the silica and/or alumina type comprising SiOH and/or AlOH surface functional groups selected from the group formed of precipitated or pyrogenated silicas, aluminas or aluminosilicates or alternatively carbon blacks modified during or after synthesis with BET specific surface area of between 30 and 260 m$^2$/g used at a content of between 30 and 50 phr,
- d) or a blend of carbon black described at (a) and/or of carbon black described at (b) and/or a white filler described at (c), in which the overall filler content is comprised between 40 and 60 phr.

18. The tire according to claim 1, wherein said reinforcing elements of at least one working crown layer are cords with saturated layers, at least one internal layer being sheathed by a layer made of a polymer composition such as a non-crosslinkable, crosslinkable or crosslinked rubber composition based on at least one diene elastomer.

* * * * *